United States Patent [19]
Edwards

[11] 3,750,390
[45] Aug. 7, 1973

[54] CHAIN LINKS
[76] Inventor: Floyd F. Edwards, 10831 W. St. Martins Dr., Franklin, Wis. 53132
[22] Filed: Mar. 8, 1971
[21] Appl. No.: 121,782

[52] U.S. Cl.............................. 59/78, 59/84, 59/90
[51] Int. Cl............................................. F16g 13/18
[58] Field of Search........................... 59/78, 90, 84; 198/189

[56] References Cited
UNITED STATES PATENTS
1,714,721  5/1921  Mojonnier ........................ 198/189
3,566,603  3/1971  Chadwick ........................... 59/78.1

FOREIGN PATENTS OR APPLICATIONS
1,005,453  3/1957  Germany ............................ 198/189

Primary Examiner—Charles W. Lanham
Assistant Examiner—Gene P. Crosby
Attorney—Gerald P. Welch

[57] ABSTRACT

A chain link for use in chains utilized in the operations of cutting or welding relatively large pipe elements by means rotated about the pipe. The link carries a large ball bearing which protrudes from an aperture in the link body to bear against the pipe, and a plurality of relatively smaller bearings concealed within the link body and in contact with the large bearing.

3 Claims, 5 Drawing Figures

PATENTED AUG 7 1973 3,750,390

Inventor
Floyd F. Edwards
By
Gerald P. Welch
Attorney

3,750,390

CHAIN LINKS

BRIEF SUMMARY OF THE INVENTION

The chain link includes a body portion which has a central projection at one end bored to receive a connecting pin, and a pair of spaced projections at the opposite end also having bores to accommodate a link connecting pin. A ball bearing protrudes through one face of the body portion to bear against a pipe which is being encircled by the chain. Internally of the body portion the ball bearing rests on a plurality of relatively small ball bearings, the latter being retained within a retainer plate covering the said body portion.

Figure 1:
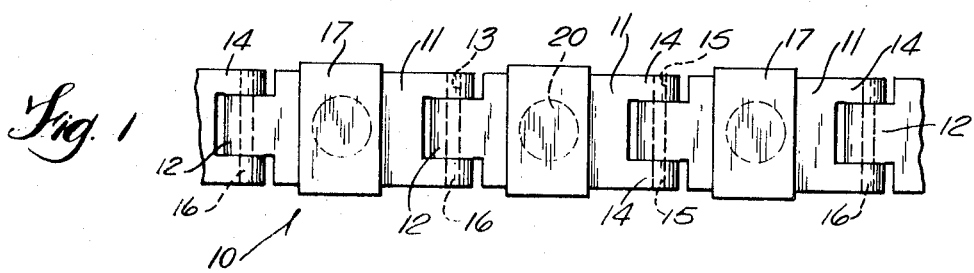
FIG. 1 is a plan view in elevation of a plurality of chain links embodying the invention.
Figure 2:
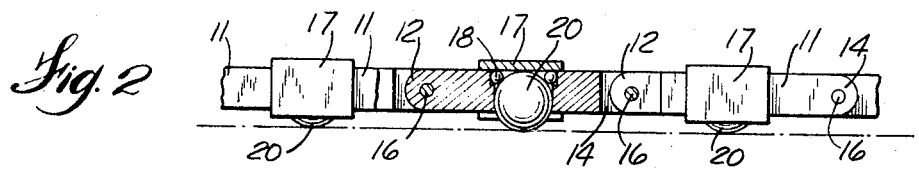
FIG. 2 is an edge view of a portion of chain partly in elevation and partly in section.

The chain link 10 includes a body portion 11, a tongue 12 having a horizontal bore at 13, a pair of integral projecting portions 14 having horizontal bores as at 15 to accommodate connecting pins 16. A retainer plate 17 holds a plurality of small ball bearings 18 within the body portion 11 against the race 19 and the large ball bearing 20 which partly protrudes through an aperture at 21.

This type of chain is useful in pipe cutting or in pipe welding operations, wherein a chain attached to a cutting or welding device embraces the pipe while the device traverses the pipe.

Figure 3:
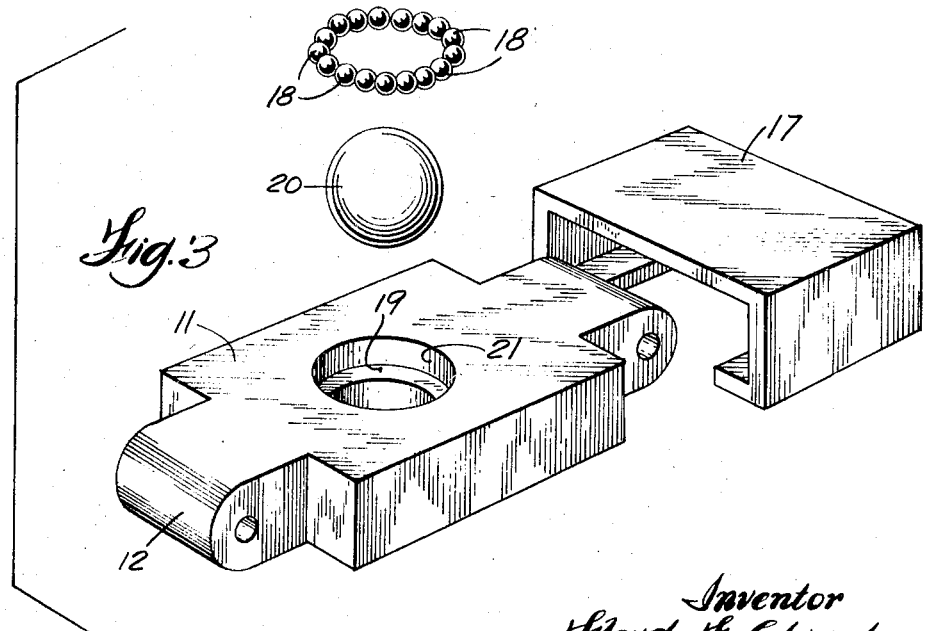
FIG. 3 is an exploded perspective view of the device.

The double-tongued link shown in FIG. 3 is useful as a master link as when the one link is combined with another chain of links where the second chain is a link short.

Figures 4, 5:
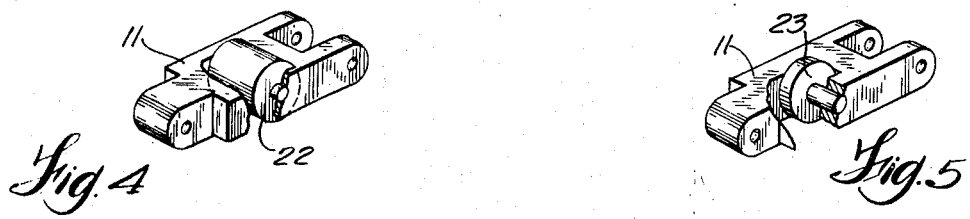
FIG. 4 illustrates a link containing a roller as the bearing.
FIG. 5 shows a link with a relatively narrow roller.

The roller and disc bearings in FIGS. 4 and 5 are modifications of the invention.

Having thus described the invention, what is claimed and desired to be secured by Letters Patent of the United States, is:

1. A chain link including connecting means at each end, a flattened body portion having a central aperture in one face thereof, a ball bearing within said body partially protruding through said aperture, a circular plurality of relatively smaller ball bearings, a race accommodating the latter concealed within the opposite face of said body portion to maintain the small bearings in rolling contact with the large protruding bearing.

2. A chain link as in claim 1 for incorporation in a pipe encircling chain whereby the large ball bearings are inwardly directed to bear against the outer surface of the pipe when said chain is moved in rotation about the pipe.

3. A chain link as in claim 1 and a cover plate over the small bearings to retain the latter within the race and in rolling contact with the large ball bearing.

* * * * *